United States Patent
Nevin et al.

(10) Patent No.: US 9,717,366 B2
(45) Date of Patent: Aug. 1, 2017

(54) BEVERAGE FORMING STATION DOOR FOR BEVERAGE MACHINE

(71) Applicant: Keurig Green Mountain, Inc., Waterbury, VT (US)

(72) Inventors: Joel Nevin, Portsmouth, NH (US); Cynthia Weflen, Somerville, MA (US)

(73) Assignee: Keurig Green Mountain, Inc., Waterbury, VT (US)

( * ) Notice: Subject to any disclaimer, the term of this patent is extended or adjusted under 35 U.S.C. 154(b) by 301 days.

(21) Appl. No.: 13/795,673

(22) Filed: Mar. 12, 2013

(65) Prior Publication Data

US 2014/0272076 A1    Sep. 18, 2014

(51) Int. Cl.
   A47J 31/44     (2006.01)
   A47J 31/36     (2006.01)
   A47J 31/06     (2006.01)

(52) U.S. Cl.
   CPC ....... *A47J 31/4407* (2013.01); *A47J 31/3623* (2013.01); *A47J 31/3633* (2013.01); *A47J 31/3676* (2013.01); *A47J 31/0642* (2013.01)

(58) Field of Classification Search
   CPC .............. A47J 31/4407; A47J 31/3623; A47J 31/3633; A47J 31/3676; A47J 31/368; A47J 31/369; A47J 31/4425–31/4453
   USPC .................................................. 296/147, 155
   See application file for complete search history.

(56) References Cited

U.S. PATENT DOCUMENTS

| | | | | |
|---|---|---|---|---|
| 3,050,211 A | * | 8/1962 | Hutterer | 220/232 |
| 4,152,872 A | * | 5/1979 | Tanizaki | E05D 15/1047 16/96 R |
| 4,157,846 A | * | 6/1979 | Whitcroft | B60J 5/062 296/155 |
| 4,602,815 A | * | 7/1986 | Boots | B60J 7/0435 296/216.03 |
| 5,140,316 A | * | 8/1992 | DeLand | B60J 5/06 180/271 |
| 5,881,896 A | * | 3/1999 | Presnell et al. | 220/252 |
| 5,979,114 A | * | 11/1999 | Clark | B60J 5/06 49/214 |
| D473,745 S | | 4/2003 | Mulle et al. | |
| 6,827,392 B2 | * | 12/2004 | Doncov et al. | 296/147 |
| 6,918,257 B2 | * | 7/2005 | Slone et al. | 62/3.61 |
| 6,921,887 B2 | * | 7/2005 | Back | A47J 37/08 219/680 |

(Continued)

FOREIGN PATENT DOCUMENTS

CA        934178 A1      9/1973
WO   WO 2012072766 A1   6/2012

OTHER PUBLICATIONS

International Search Report and Written Opinion from corresponding PCT Application No. PCT/US2014/020463 dated May 16, 2014.

*Primary Examiner* — David Angwin
*Assistant Examiner* — John J Norton
(74) *Attorney, Agent, or Firm* — Wolf, Greenfield & Sacks, P.C.

(57) ABSTRACT

A method and apparatus for opening and closing a door of a beverage forming machine, e.g., for accessing a beverage forming station. The door may be opened by retracting the door into an interior space of the housing, e.g., by moving the door rearwardly. When at the closed position, at least one edge of the door may be flush with an adjacent outer housing portion.

18 Claims, 7 Drawing Sheets

(56) References Cited

U.S. PATENT DOCUMENTS

| | | | |
|---|---|---|---|
| 7,189,945 B2* | 3/2007 | Starr | A47J 37/0814 |
| | | | 219/386 |
| 7,215,240 B2* | 5/2007 | Uehara | B60J 5/06 |
| | | | 340/425.5 |
| 7,997,187 B2 | 8/2011 | Garman et al. | |
| 8,091,470 B2 | 1/2012 | De'Longhi | |
| 8,876,314 B2* | 11/2014 | Zhu | F25D 27/00 |
| | | | 362/249.02 |
| 2007/0085374 A1* | 4/2007 | Mather et al. | 296/155 |
| 2008/0216667 A1* | 9/2008 | Garman | 99/304 |
| 2010/0200563 A1* | 8/2010 | Yoshidome | F24C 15/006 |
| | | | 219/399 |
| 2010/0229731 A1* | 9/2010 | De' Longhi | 99/299 |
| 2012/0121768 A1* | 5/2012 | Lai et al. | 426/231 |
| 2012/0171332 A1* | 7/2012 | Lai | A47J 31/42 |
| | | | 426/78 |

* cited by examiner

BEVERAGE FORMING STATION DOOR FOR BEVERAGE MACHINE

BACKGROUND

1. Field of Invention

This invention relates to beverage forming systems, such as coffee brewers that use a liquid to form a coffee beverage.

2. Related Art

Beverage forming systems that use a liquid, such as water, to form a beverage are well known. For example, U.S. Pat. No. 7,997,187 discloses a beverage forming system that uses a beverage cartridge containing a beverage material to make a beverage by introducing liquid into the cartridge. A roll top lid may be moved to an open position to access a brew chamber, e.g., to provide ground coffee to the brew chamber.

SUMMARY OF INVENTION

Aspects of the invention relate to methods and apparatus for opening and closing a beverage forming station door of a beverage forming machine. In some embodiments, the door may be retracted into the housing when open, yet be positioned so that its edges are flush with the surrounding housing portions, e.g., so that the presence of the door is less noticeable and giving an improved appearance to the beverage machine. Movement of the door may be driven by movement of a cartridge holder, e.g., as the cartridge holder is moved to its open position, the door may be opened. Thus, a single actuator may be used to open both the door to exposed the cartridge holder and to move the cartridge holder to the open position to receive a cartridge. In one embodiment, a single handle may be moved to move the cartridge holder between open and closed positions, and the door may be linked to the cartridge holder so that movement of the cartridge holder drives the door movement.

In one aspect of the invention, a beverage forming apparatus includes a housing to support components of the beverage forming apparatus. The housing may have an opening, e.g., that conceals a cartridge holder or other part of a beverage forming station, and a door movably mounted to the housing to move between a closed position in which the door closes the opening and an open position in which the door is positioned away from the opening. The door may be movable to be retracted within the housing in the open position, e.g., the door may slide rearwardly along one or more tracks in a translational fashion into a space inside the housing. Moreover, the door may be flush with at least an outer portion of the housing adjacent at least one edge of the door when the door is in the closed position. For example, the one or more tracks that guide movement of the door may position the door so that its rear edge extends outwardly in a last phase of movement so the rear edge of the door is flush with the adjacent housing portion.

The beverage forming apparatus may also include a beverage forming station supported by the housing and arranged to combine a precursor liquid with a beverage material to form a beverage that is dispensed via a beverage outlet. A portion of the beverage forming station, such as a cartridge holder, a filter basket, beverage material hopper, etc., may be arranged to receive beverage material provided by a user through the opening with the door in the open position. As noted above, a user may place a cartridge in a now exposed cartridge holder with the door in the open position. A precursor liquid supply system may be supported by the housing and provide precursor liquid to the beverage forming station, e.g., for mixing with the beverage material to form a beverage, and a control circuit may be arranged to control the liquid supply system to deliver precursor liquid to the beverage forming station.

In one embodiment, an actuator, such as a handle pivotally mounted relative to the housing, may be arranged to move the door between the open and closed positions. Also, the handle may move a cartridge holder between open and closed positions as well. Thus, the cartridge holder may be movable between an open position in which the cartridge holder is oriented to receive a cartridge through the opening, and a closed position in which the cartridge holder is positioned to at least partially enclose a cartridge for forming a beverage. In some arrangements, the door may be linked to the cartridge holder such that movement of the cartridge holder between the open and closed positions moves the door between the open and closed positions.

As mentioned above, at least one track may be used to guide movement of the door between the open and closed positions. The door may include at least one pin that engages the at least one track, e.g., so that the track may guide movement of the door by guiding the pin in movement. In one embodiment, the at least one track includes two forward tracks and two rear tracks, and the door includes four pins, e.g., at each corner of a rectangular door panel, that each engage with a respective track.

The door may be positioned to have any suitable portions of the door arranged flush with adjacent housing portions. For example, the door may be flush with outer housing portions on side edges and/or a front edge of the door as well as the rear edge. The door may be arranged in a variety of ways, e.g., may be a rigid and flat panel having a rectangular shape.

In another aspect of the invention, a method for controlling access to a beverage forming station of a beverage machine includes moving a door that is movably mounted to a housing of the beverage machine to move the door from a closed position, in which the door closes an opening of the housing, to an open position in which the door is retracted into the housing and positioned away from the opening. A beverage forming station may be accessed through the opening, e.g., to place or remove a cartridge at the forming station, place or remove beverage material, etc. The door may then be moved to the closed position so that the door is flush with at least an outer portion of the housing adjacent at least one edge of the door when the door is in the closed position.

Moving of the door to the open position may include moving a handle to move the door from the open position to the closed position, and such movement may also move a cartridge holder of the beverage forming station from a closed position to the open position. As noted above, moving the door to the closed position may include moving the door so that the rear edge of the door, one or more side edges, and/or the front edge of the door are flush with adjacent outer housing portions. The door may be moved by sliding the door from the closed position to the open position along at least one guide track.

These and other aspects of the invention will be apparent from the following description and claims.

BRIEF DESCRIPTION OF DRAWINGS

Aspects of the invention are described below with reference to the following drawings in which like numerals reference like elements, and wherein.

DETAILED DESCRIPTION

It should be understood that aspects of the invention are described herein with reference to certain illustrative embodiment and the figures. The illustrative embodiments described herein are not necessarily intended to show all aspects of the invention, but rather are used to describe a few illustrative embodiments. Thus, aspects of the invention are not intended to be construed narrowly in view of the illustrative embodiments. In addition, it should be understood that aspects of the invention may be used alone or in any suitable combination with other aspects of the invention.

Figure 1:
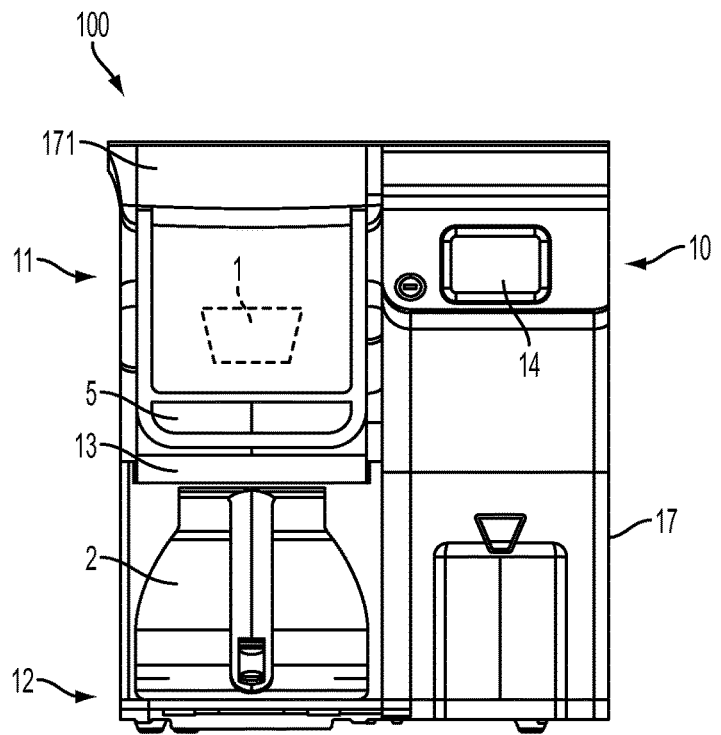
FIG. 1 is a front view of a beverage forming apparatus in an illustrative embodiment showing a beverage forming station door in a closed position.
Figure 2:
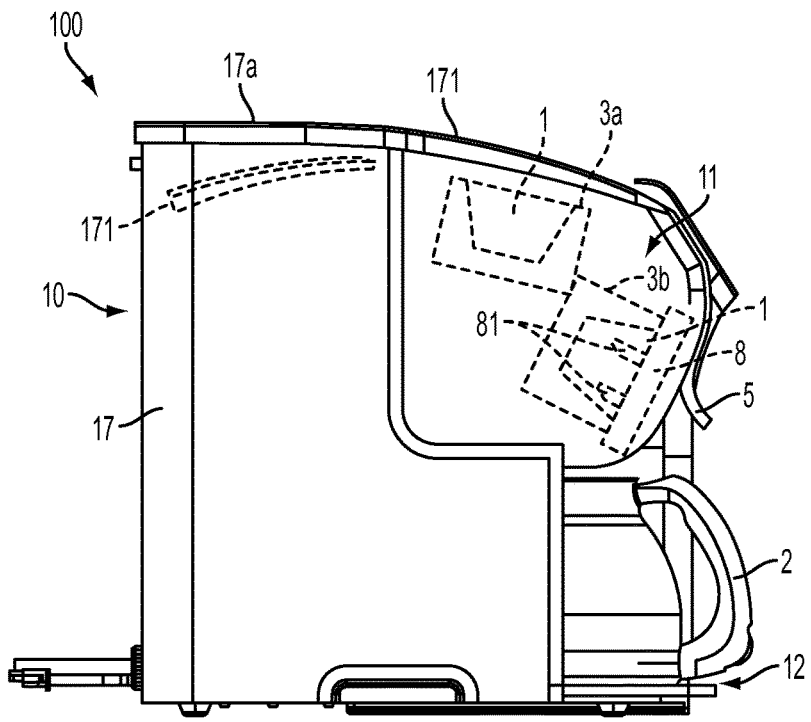
FIG. 2 is a left side view of the FIG. 1 embodiment.

FIGS. 1 and 2 show front and side views of a beverage forming apparatus 100 in an illustrative embodiment that incorporates aspects of the invention. In this embodiment, the beverage forming machine 10 includes a housing 17 that houses and/or supports components of the machine 10, such as a user interface 14 used to control system operation, and defines a container receiving area 12 at which the container 2 is positionable to receive beverage dispensed by the machine 10 via a beverage outlet. Thus, at the container receiving area 12, the container 2 is associated with the machine 10 to receive a dispensed beverage and may be supported by the housing 17. In this embodiment, the apparatus 100 may include a container lid detector 13 that is arranged to detect whether a lid that covers an opening of the container 2 is in an open position or a closed position. For example, the lid detector 13 may include any suitable sensors to detect a lid's presence, such as magnetic, inductive, resistive, capacitive or other sensors used to detect a magnetic or other physical characteristic of a lid. In some embodiments, the beverage forming machine 10 may be controlled to dispense beverage from the beverage outlet 3 only if the container 2 is detected to have its lid in the open position. However, the machine 10 need not necessarily have a lid detector 13, and instead may make beverage whether the container 2 is suitably positioned at the container receiving area 12 or not.

Although the beverage forming apparatus 100 may be used to form any suitable beverage, such as tea, coffee, other infusion-type beverages, beverages formed from a liquid or powdered concentrate, soups, juices or other beverages made from dried materials, or other, in this illustrative embodiment, the apparatus 100 is arranged to form coffee or tea beverages. As is known in the art, a beverage cartridge 1 containing beverage material may be provided to the apparatus 100 and used to form a beverage that is deposited into the container 2. In some embodiments, the cartridge 1 may be manually or automatically placed in a cartridge holder 3 of a beverage forming station 11 of the beverage forming machine 10. For example, the cartridge holder 3 may be exposed to receive the cartridge 1 by opening a beverage forming station door 171 when the user operates a handle 5 or other actuator. With the cartridge 1 placed in the cartridge holder 3, the actuator 5 may be operated to at least partially enclose the cartridge 1, e.g., so that water or other precursor liquid can be introduced into the cartridge 1 to form a beverage. As can be seen in FIG. 2, the cartridge holder 3 may be moved from an open position in which the opening of the cartridge holder 3 is oriented in a upwardly inclined position facing the front of the machine 10 (identified as 3a) and a closed position in which the opening of the cartridge holder 3 is in a downwardly inclined position (identified as 3b) and pressed against a lid or cover 8. In this embodiment, inlet and outlet piercing elements 81 on the lid or cover 8 penetrate into the cartridge 1 to provide liquid into the cartridge 1 and allow beverage to exit the cartridge 1, although such an approach is not necessary. U.S. Pat. No. 8,361,527 describes a cartridge and a system for introducing liquid into the cartridge that may be used in embodiments of this invention, and is hereby incorporated by reference in its entirety. Of course, aspects of the invention may be employed with any suitably arranged apparatus 100, including drip-type coffee brewers, carbonated beverage machines, and others arranged to form a beverage regardless of how the beverage is formed. For example, a cartridge 1 need not necessarily be used, but instead beverage material or other materials used to form a beverage may be provided to the beverage forming station 11 in other ways, such as by pouring a powdered beverage mix into a mixing chamber, placing a brew funnel with a filter element and beverage material into a holder, etc.

In accordance with an aspect of the invention, a cartridge holder having an opening arranged to receive and hold a cartridge may be moved between an open position, e.g., in which the opening of the cartridge holder faces a front of the beverage forming machine and is in an upwardly inclined position, and a closed position, e.g., in which the cartridge is at least partially enclosed in a space for forming a beverage. Moving of the cartridge holder between the open position and the closed position may be performed by operating a handle or other actuator.

Also, in accordance with another aspect of the invention, a beverage forming station door may be moved between open and closed positions, e.g., to expose at least a portion of the beverage forming station 11 such as a cartridge holder 3. For example, the door may be opened to expose the cartridge holder in the open position, ready to receive a cartridge used to form a beverage. In some embodiments, a single actuator, such as a handle 5, may be operated to move both the cartridge holder 3 and the door 171 between their respective open and closed positions. However, in other arrangements, the door 171 and the holder 3 (if provided) may be moved independently. For example, the door 171 may be opened and closed by a user manually gripping and moving the door 171.

Figure 3:
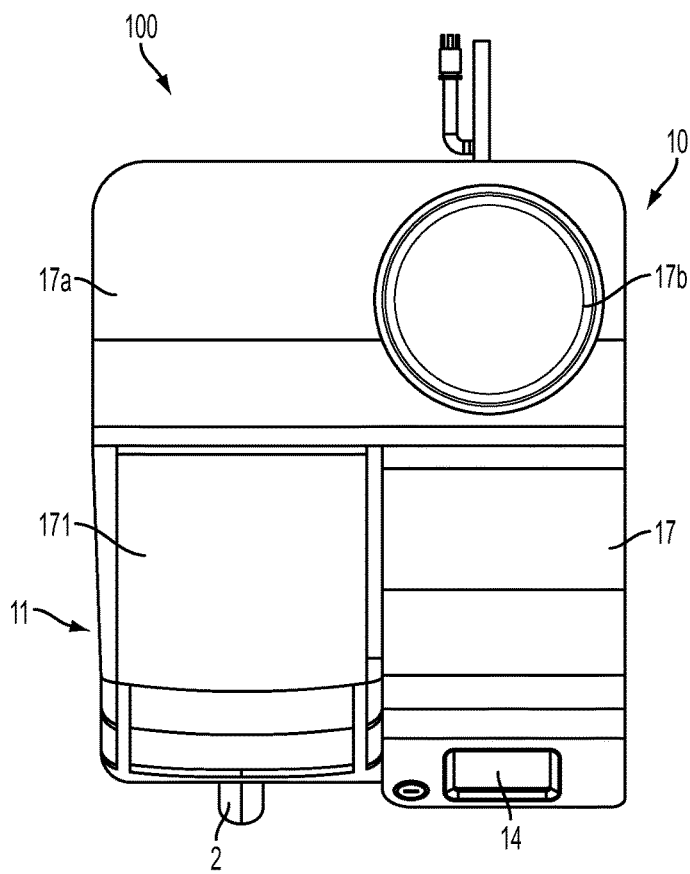
FIG. 3 is a top view of the FIG. 1 embodiment.

In accordance with an aspect of the invention, the door 171 may be retracted into an interior space of the housing 17 when in the open position. For example, as shown in FIG. 2, the door 171 may be moved rearwardly from its closed position (shown in FIGS. 1 and 2 in solid line) in which the door closes an opening of the housing 17 through which the beverage forming station 11 can be accessed, to the open position where the door 171 is located inside the housing 17. In this embodiment, the door 171 is located under a top portion 17a of the housing 17 when in its open position, as shown in dashed line in FIG. 2. This arrangement may make opening of the door 171 more convenient for a user, e.g., by making the top portion 17a of the machine 10 available for supporting objects without interfering with opening and closing of the door 171. For example, as seen in FIG. 3, one or more areas of the top portion 17a may be arranged to support a container 2, e.g., at a container support area 17b. By having the door 171 move into the housing 17, the door 171 does not require the top portion 17a of the housing 17 to be clear of items, nor is any part of the top portion 17a required to move to permit the door 171 to move. This is in contrast to some beverage machines that displace all or a part of a top portion of a machine housing, or require areas around the machine to be clear of items, when opening and closing a brew chamber or other portion of the beverage forming station.

Figure 4:
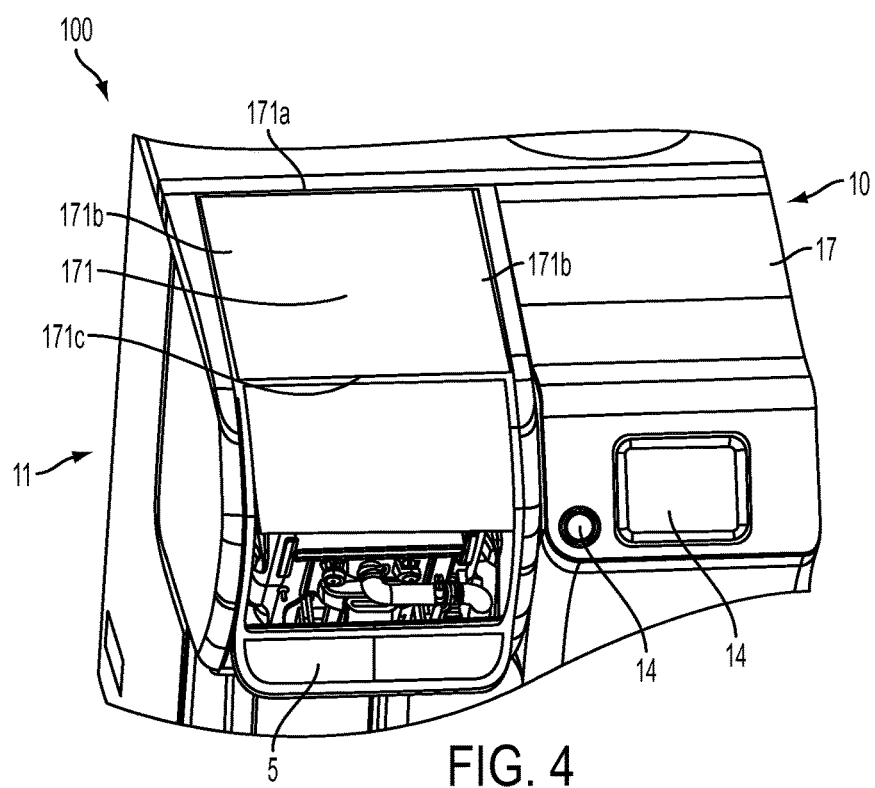
FIG. 4 is a front perspective view of the beverage forming station door of the FIG. 1 embodiment.

In accordance with another aspect of the invention, the beverage forming station door may be positioned in the closed position so that one or more edges of the door is flush with an adjacent outer portion of the housing. For example, and as can be seen more clearly in FIG. 4, with the door 171 in the closed position, a rear edge 171a, side edges 171b and a front edge 171c may be flush with an adjacent portion of the outer housing. As a result, the door may provide a cleaner appearance that lacks overlapping or stepped joints between the door 171 and the housing 17. Also, the flush configuration may help conceal the location of the door 171, and provide an element of surprise to the user when the door 171 is opened.

Figure 5:
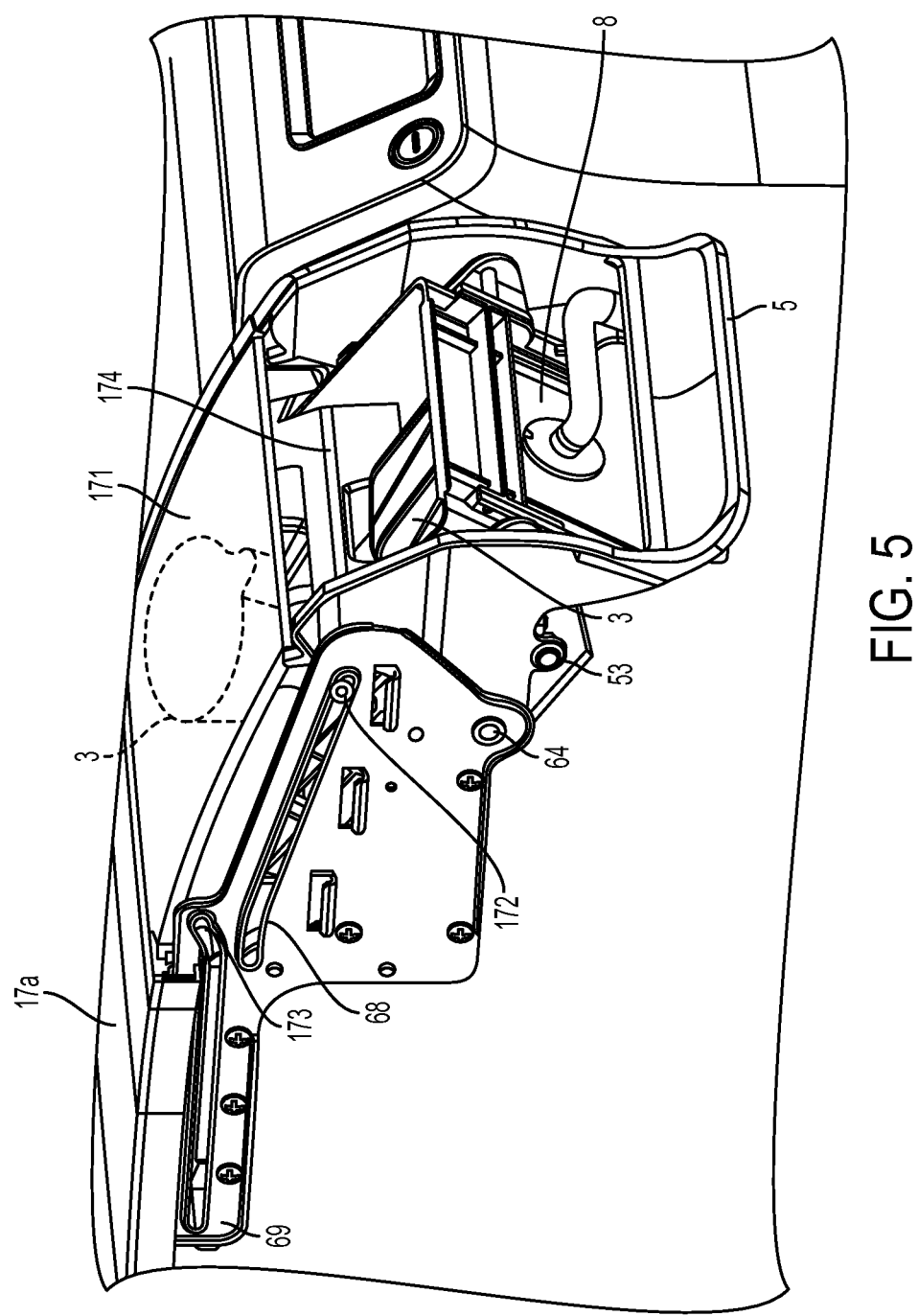
FIG. 5 is a left side perspective view in partial cut away of the FIG. 4 embodiment illustrating the cartridge holder in the open position.

FIG. 5 shows a perspective view with some components of the beverage forming machine 10 removed from view to illustrate how the door 171 may be moved between open and closed positions in this illustrative embodiment. It should be noted, however, that the door may be moved between its open and closed positions in other ways, and that aspects of the invention are not limited the illustrative embodiments described herein. FIG. 5 shows the door 171, cartridge holder 3 and handle 5 in solid line in the closed position. As can be seen, the door 171 closes an opening in the housing 17 through which the beverage forming station 11 can be accessed, and edges of the door 171 are flush with adjacent outer housing portions. However, when the handle 5 is raised to an open position (not shown for clarity), the cartridge holder 3 is moved to the open position, shown in dashed line in FIG. 5. As described in more detail below, movement of the handle 5 to the open position also causes the door 171 to slide rearwardly to expose a cavity in the housing 17 in which the cartridge holder 3 is located. The door 171 moves rearwardly along tracks 68 and 69 that engage pins 172, 173 of the door 171 and thus guide the door 171 in its movement. Accordingly, the door 171 may be retracted into an interior space inside the housing 17, e.g., by moving the door 171 translationally in a rearward direction.

As is shown in more detail below, the door 171 is coupled to the cartridge holder 3 by a link 174 that drives the door 171 with movement of the cartridge holder 3. That is, in this embodiment, movement of the cartridge holder 3 drives the movement of the door 171 between the open and closed position. However, this coupling is not required, and the door 171 could be moved independently of the cartridge holder 3. For example, the door 171 may be moved manually by a user, e.g., by gripping a tab or knob on the door 171 and sliding the door rearwardly or forwardly. Alternately, the door 171 could be moved by a motor drive (e.g., including a ball and screw or rack and pinion system), a handle and linkage, etc. The door 171 may include a detent that tends to keep the door 171 at the open and/or closed position and requires the exertion of force on the door 171 above a threshold to clear the detent and move the door 171.

As can be seen in FIG. 5, the rear track 69 has a curved section at the forward end that moves the rear end of the door 171 downwardly as the cartridge holder 3 starts to move rearward and toward the open position. As a result, the door 171 can be retracted under the top portion 17a of the housing 17 as the door 171 moves to its open position because the door 171 dips downwardly to clear the top portion 17a. Similarly, movement of the door 171 to the closed position draws the door 171 forward into the position shown in FIG. 5. The curved section of the rear track 69 causes the rear end of the door 171 to be lifted up in the last portion of the door's movement, positioning the door 171 so that it is flush with the housing 17 at the area where the rear portion of the door 171 is adjacent the top portion 17a of the housing 17. The tracks 68 and 69 may also locate the side and front edges of the door 171 so they are flush with adjacent outer housing portions, as shown.

Figure 6:
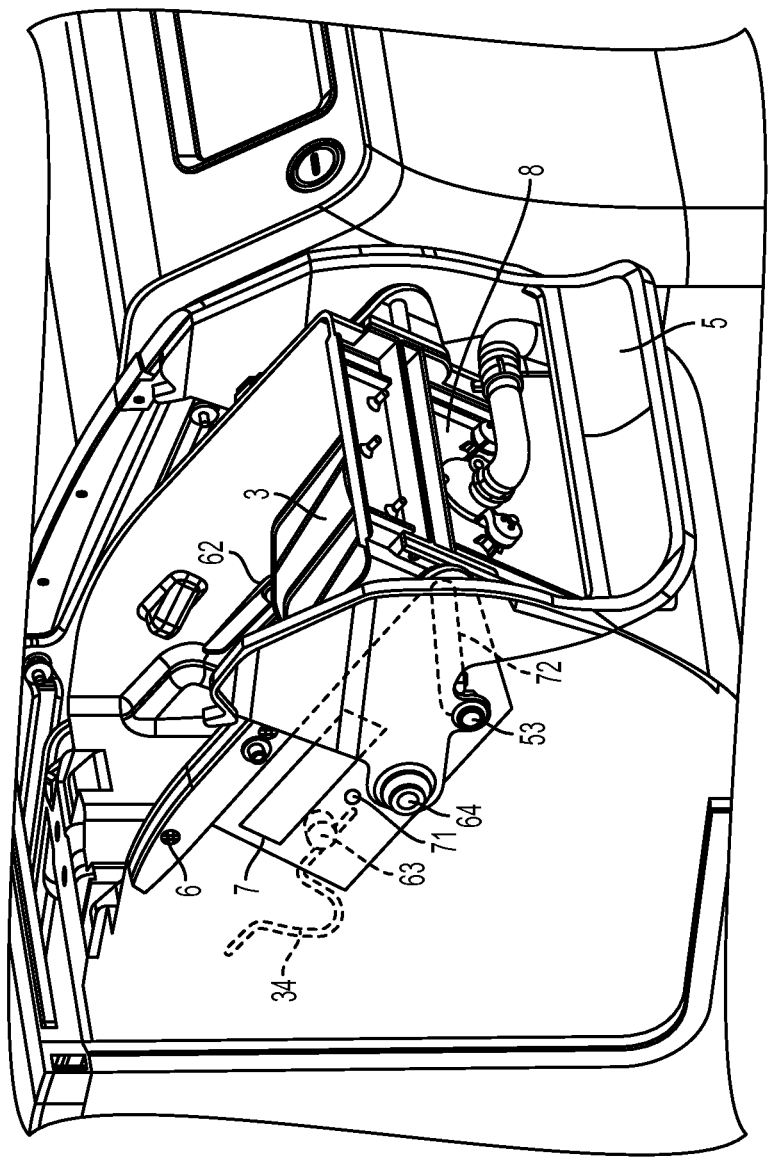
FIG. 6 is another left side perspective view illustrating portions of the cartridge holder mechanism.
Figure 7:
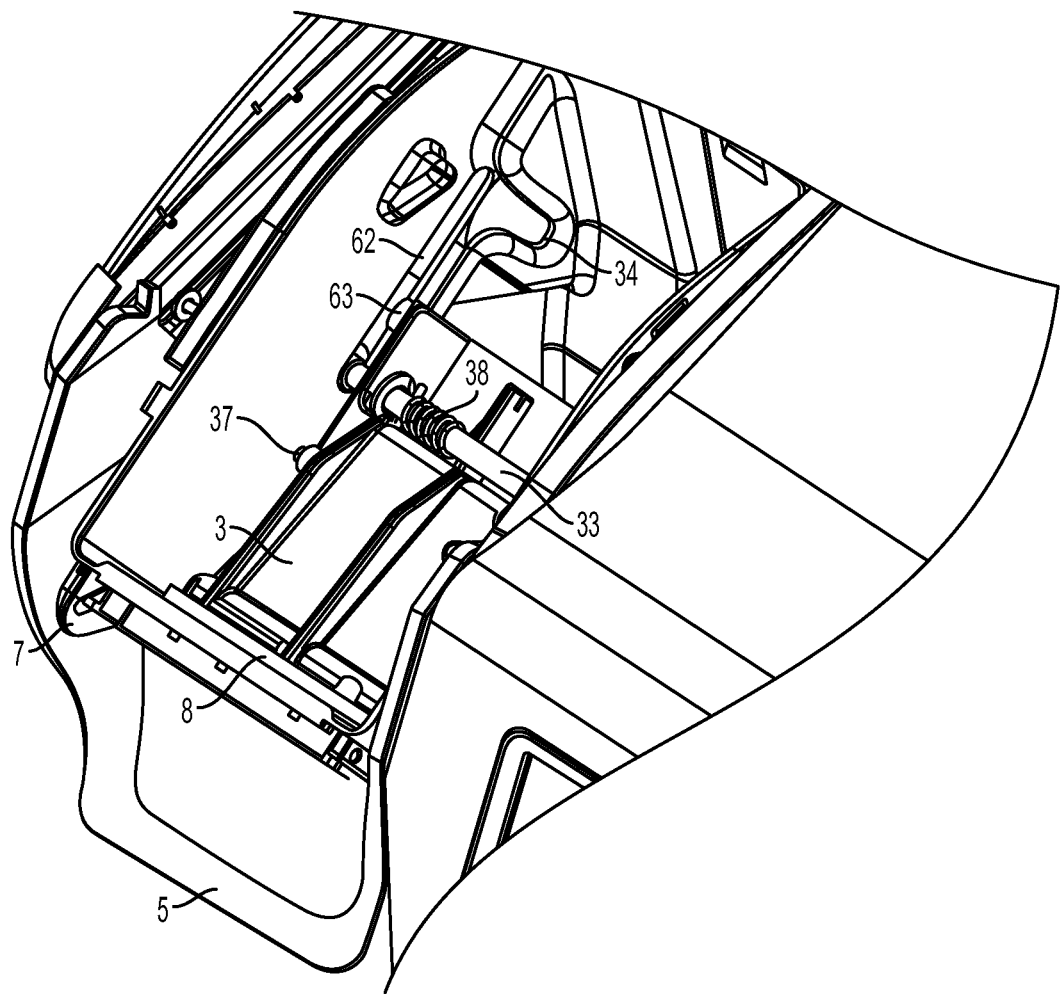
FIG. 7 is a top right perspective view of the cartridge holder in the FIG. 6 embodiment.

FIGS. 6 and 7 show other views of this embodiment, again with further components, including the door 171, removed for clarity. (FIGS. 6 and 7 are used to illustrate how the cartridge holder 3 moves in this embodiment. Since the door 171 is linked to the cartridge holder 3, movement of the holder 3 is relevant to how the door 171 moves.) A slider 7 can be seen in this view, which engages with a pivot pin 33 of the cartridge holder 3 at a location 71. The pivot pin 33 extends through a slot 62 in the frame 6 to engage with the slider 7. (See the rear right side of the cartridge holder 3 in FIG. 6 to see the slot 62 on the right side of the holder 3. The left side slot 62 is not shown in FIG. 6 for clarity.) The slider 7 rides in a track of the frame 6 so that the slider 7 can move linearly along the direction of the slot 62. Thus, the pivot pin 33 of the cartridge holder 3 is moveable along a linear path defined by a first slot 62. The slider 7 is moved in its track by a drive pin 53 of the handle 5 that engages with a drive slot 72 of the slider 7. That is, as the handle 5 is rotated upwardly (counterclockwise as seen in FIG. 6) about a handle axis 64 (where the handle 5 is pivotally mounted to the frame 6), the drive pin 53 rides in the drive slot 72, pushing the slider 7 to move rearwardly relative to the frame 6. Similarly, downward movement of the handle 5 (clockwise rotation about the handle axis 64) engages the drive slot 72 to move the slider 7 forwardly. A spring assist may be employed to help move the slider 7 forwardly or rearwardly, if desired. The drive slot 72 may include a detent or lock portion near a lower end that locks the slider 7 in place with the handle 5 in the closed position. Alternately, or additionally, the handle 5 may include a detent. This may help prevent unwanted movement of the cartridge holder 3 when the handle 5 is in the closed position, e.g., due to pressure in the cartridge, unless the handle 5 is purposely moved toward the open position.

As can also be seen in dashed line in FIG. 6, a cam 34 is formed in a portion of the frame 6 and has an L-shape with a downwardly extending portion. A cam follower 63 attached to the cartridge holder 3 rides along the cam 34 as the cartridge holder 3 moves along the linear path of the slot 62 and causes the cartridge holder 3 to rotate about the pivot pin 33 when the cam follower 63 moves downwardly into the downwardly extending portion of the cam 34. FIG. 7 shows a top perspective view from the front right side of the beverage forming machine 10 and more clearly shows the cam 34, cam follower 63 and first slot 62. In this embodiment, the cartridge holder 3 also includes a torsion spring 38 that biases the cartridge holder 3 to rotate upwardly about the pivot pin 33 (or pivot axis 32) toward the open position. Thus, in this embodiment, engagement of the cam follower 63 with the cam 34 does not actually drive rotation of the holder 3 toward the open position. Instead, the cam follower 63 and cam 34 control the holder's rotation toward the open position as driven by the spring 38. However, as the pivot pin 33 moves forwardly along the slot 62, the cam 34 and cam follower 63 drive the rotation of the cartridge holder 3 downwardly toward the closed position. Of course, the cam 34 could be arranged to drive rotation of the cartridge holder 3 both upwardly and downwardly, e.g., by capturing the cam follower 63 on both top and bottom sides in a cam groove. Regardless, whether the cam and cam follower drive movement of the holder 3 toward the open and/or closed position, the cam and cam follower are said to cause the rotation of the cartridge holder 3 between the open and closed position because without the presence of the cam and cam follower, the cartridge holder 3 would not rotate as described.

Figure 8:
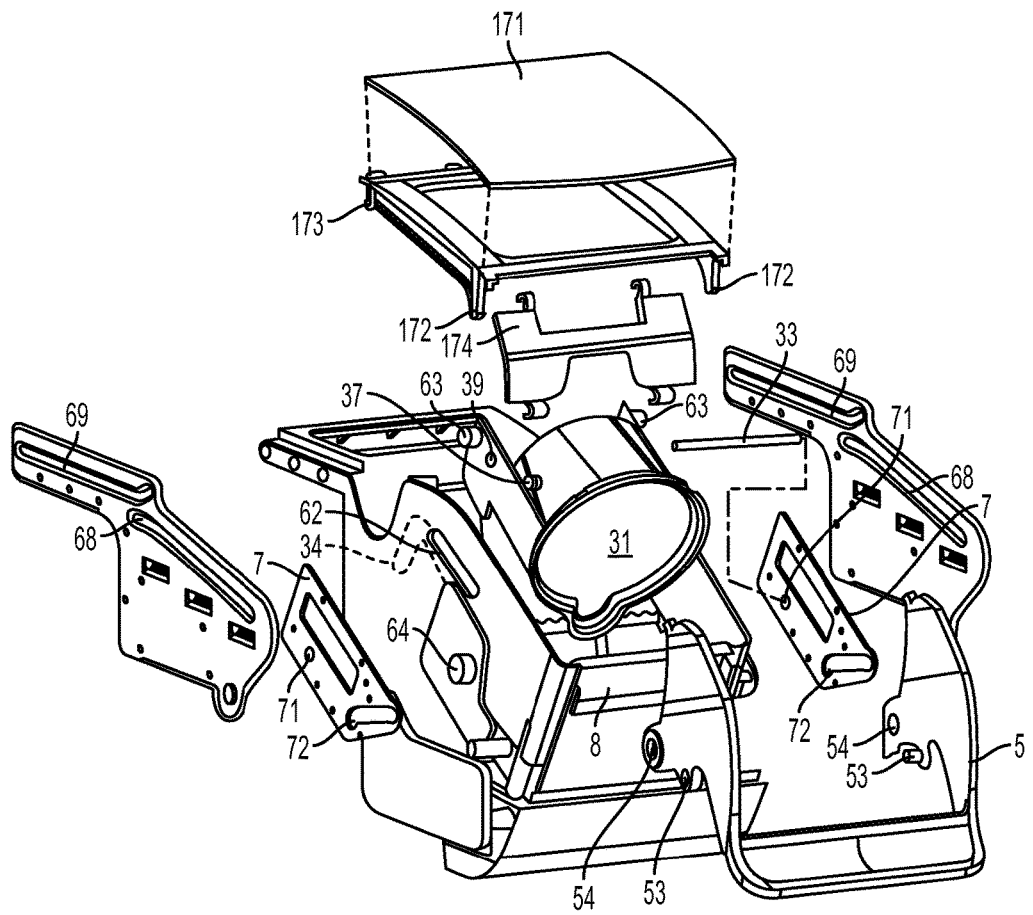
FIG. 8 is an exploded view of the cartridge holder mechanism in the FIG. 6 embodiment.

FIG. 8 shows an exploded view of this embodiment, and more clearly shows some elements of the cartridge holder mechanism. For example, holes 39 in the cartridge holder 3 are shown which receive the pivot pin 33. Thus, the pivot pin 33 in this embodiment extends across the width of the cartridge holder 3 from a slider 7 on the right side to a slider 7 on the left side. The sliders 7 in this embodiment are formed as flat plates, but may be arranged in other ways. Also shown is the link 174 that connects the cartridge holder 3 to the door 171. The link 174 may be pivotally connected to both the cartridge holder 3 (e.g., at pins 37 extending from the sides of the holder 3—see FIG. 7) and the door 171 (e.g., at pins formed on an underside of the door 171). Alternately, the door 171 could be coupled to the sliders 7 or other component that drives movement of the door 171 between its open and closed positions. Since the door 171 is coupled to the cartridge holder 3 by the link 174, movement of the holder 3 between the open and closed positions also moves the door 171 between its open and closed positions.

Figure 9:
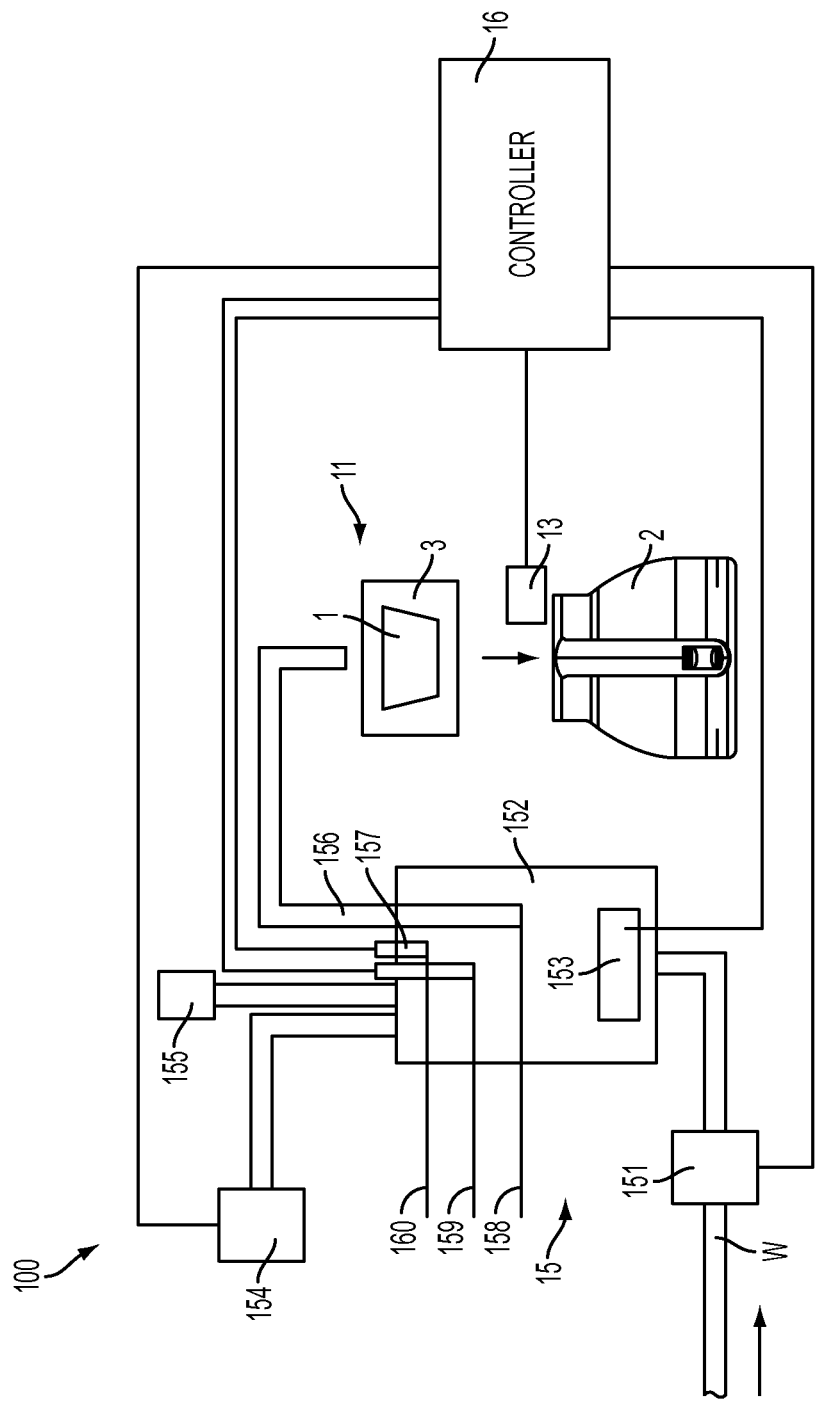
FIG. 9 is a schematic diagram of components of a beverage forming apparatus in an illustrative embodiment.

FIG. 9 shows a schematic block diagram of various components that may be included in a beverage forming apparatus 100 in one illustrative embodiment. Those of skill in the art will appreciate that a beverage forming apparatus 100 may be configured in a variety of different ways, and thus aspects of the invention should not be narrowly interpreted as relating only to one type of beverage forming apparatus. In this embodiment, water or other precursor liquid may be provided by a liquid supply 15 to mix with a beverage material at a beverage forming station 11. The beverage material (such as coffee grounds, tea leaves, a powdered drink mix, etc.) may be provided in a cartridge 1, or not, and beverage produced by mixing the liquid with the beverage material may be dispensed into the container 2 via a beverage outlet.

The liquid supply 15 in this embodiment controls the volume of liquid provided to the beverage forming station 11 by filling the tank to a liquid dispense level 159, 160 and then pressurizing the tank 152 by way of an air pump 154 so that liquid in the tank 152 is forced out of the conduit 156 to the beverage forming station 11. The volume of liquid delivered to the beverage forming station 11 is equal to the volume in the tank 152 between the liquid delivery level 159, 160 and a post-delivery level 158 at a bottom of the conduit 156 in the tank 152. Since there are two delivery levels 159, 160 in this embodiment, two different volumes can be provided to the beverage forming station 11. However, more than two levels, or a single level, may be used.

In this embodiment, the liquid supply 15 provides liquid to the tank 152 via a valve 151 that is coupled to a source W. The source W may have any suitable arrangement, e.g., may provide liquid from a storage tank, a mains water supply or other source. Thus, in some cases, the liquid provided to the tank 152 may vary in temperature by a wide degree depending on various factors, such as time of year, a temperature of a room in which the machine 10 is located, etc. For example, if the source W is a reservoir that is filled by a user, the temperature of liquid in the reservoir may vary between room temperature (e.g., if liquid sits in the reservoir for an extended time) and a cooler temperature (e.g., if the reservoir has just been filled with water that is dispensed from a tap).

To provide liquid to the tank 152 in this embodiment, the valve 151 is controlled by the control circuit 16 to open and close to provide a desired volume of liquid to the tank 152. For example, if the tank 152 is empty or at the post-dispense level 158, the valve 151 may be opened until a conductive probe or other liquid level sensor 157 provides a signal to the control circuit 16 that indicates when liquid arrives at the dispense level 159, 160. In response to the level sensor 157 detecting liquid at the sensor 157, the control circuit 16 may close the valve 151.

Although in this embodiment the liquid level sensor includes a pair of conductive probes capable of contacting liquid in the tank 152 and providing a signal (e.g., a resistance change) indicative of liquid being present at respective dispense levels 159 or 160 in the tank 152, the liquid level sensor may be arranged in other ways. For example, the sensor may include a microswitch with an attached float that rises with liquid level in the tank 152 to activate the switch. In another embodiment, the liquid level sensor may detect a capacitance change associated with one or more liquid levels in the tank, may use an optical emitter/sensor arrangement (such as an LED and photodiode) to detect a change in liquid level, may use a pressure sensor, may use a floating magnet and Hall effect sensor to detect a level change, and others. Thus, the liquid level sensor is not necessarily limited to a conductive probe configuration. Moreover, the liquid level sensor may include two or more different types sensors to detect different levels in the tank. For example, a pressure sensor may be used to detect liquid at the dispense level 160 (e.g., complete filling of the tank 152 may coincide with a sharp rise in pressure in the tank 152), while a conductive probe may be used to detect liquid at the other dispense level 159.

Further, a liquid level sensor need not be used to fill the tank to the dispense level 159, 160. Instead, other techniques may be used to suitably fill the tank 152, such as opening the valve 151 for a defined period of time that is found to correspond to approximate filling of the tank 152 to the desired level. Of course, other arrangements for providing liquid to the tank 152 are possible, such as by a pump (e.g., a centrifugal pump, piston pump, solenoid pump, diaphragm pump, etc.), gravity feed, or other, and the way by which the tank is filled to the dispense level 159, 160 may depend on the technique used to provide liquid to the tank. For example, control of a volume of liquid provided to fill the tank 152 to the dispense level 159, 160 may be performed by running a pump for a predetermined time, detecting a flow rate or volume of liquid entering the tank 152 (e.g., using a flow meter), operating a pump for a desired number of cycles (such as where the pump is arranged to deliver a known volume of liquid for each cycle), detecting a pressure rise in the tank 152 using a pressure sensor, or using any other viable technique.

Liquid in the tank 152 may be heated by way of a heating element 153 whose operation is controlled by the control circuit 16 using input from a temperature sensor or other suitable input. Of course, heating of the liquid is not necessary, and instead (or additionally) the apparatus 100 may include a chiller to cool the liquid, a carbonator to carbonate the liquid, or otherwise condition the liquid in a way that alters the volume of liquid in the tank 152. (Generally speaking, components of the liquid supply 15 that heat, cool, carbonate or otherwise condition liquid supplied to the beverage forming station 11 are referred to as a "liquid conditioner.")

In this embodiment, liquid may be discharged from the tank 152 by an air pump 154 operating to force air into the tank 152 to pressurize the tank and force liquid to flow in the conduit 156 to the beverage forming station 11. Since the conduit extends downwardly into the tank 152, the volume of liquid delivered to the forming station 11 is defined as the volume in the tank 152 between the dispense level 159, 160 and the bottom end of the conduit 156. Again, liquid may be caused to flow from the tank 152 to the beverage forming station 11 in other ways. For example, a pump may be used to pump liquid from the tank 152 to the forming station 11, liquid may be allowed to flow by gravity from the tank 152, and others. A vent 155, which can be opened or closed to vent the tank 152, may be provided to allow the tank 152 to be filled without causing a substantial rise in pressure in the tank 152 and to allow liquid to be delivered from the tank 152 by pressurizing the tank using the air pump 154. In this embodiment, the vent 155 is actually not controlled by the control circuit 16, but remains always open with an orifice of suitable size to allow venting for filling of the tank 152, and air pressure buildup in the tank 152 to allow liquid delivery. Other flow control features may be provided as well, such as a check valve or other flow controller that can prevent backflow in the conduit between the source W and the tank 152, or between the tank 152 and the beverage forming station 11.

The beverage forming station 11 may use any beverage making ingredient, such as ground coffee, tea, a flavored drink mix, or other beverage medium, e.g., contained in a cartridge 1 or not. Alternately, the beverage forming station 11 may function simply as an outlet for heated, cooled or otherwise conditioned water or other liquid, e.g., where a beverage medium is contained in the container 2. Once liquid delivery from the tank 156 to the station 11 is complete, the air pump 154 (or other air pump) may be operated to force air into the conduit 156 to purge liquid from the beverage forming station 11, at least to some extent.

Operation of the valve 151, air pump 154 and other components of the apparatus 100 may be controlled by the control circuit 16, e.g., which may include a programmed processor and/or other data processing device along with suitable software or other operating instructions, one or more memories (including non-transient storage media that may store software and/or other operating instructions), temperature and liquid level sensors, pressure sensors, input/output interfaces, communication buses or other links, a display, switches, relays, triacs, or other components necessary to perform desired input/output or other functions.

According to another aspect of the invention, a method for controlling access to a beverage forming station of a beverage machine includes moving a door that is movably mounted to a housing of the beverage machine to move the door from a closed position, in which the door closes an opening of the housing, to an open position in which the door is retracted into the housing and positioned away from the opening. This movement may be caused by manually moving the door to the open position, operating a handle or other actuator to move the door, etc. For example, the door may be guided in movement by one or more tracks that engage with pins or other portions of the door. In some embodiments, the door may be linked to a cartridge holder so that the door moves to the open position when the cartridge holder moves to its open position.

With the door in the open position, a beverage forming station may be accessed through the opening. For example, a cartridge holder may be accessed through the opening in the housing to place a cartridge containing beverage material in the holder. In other embodiments, a spent cartridge may be removed from a holder, loose beverage material may be provided to a mixing chamber or other component of the beverage forming station, a portion of the beverage forming station may be cleaned or repaired, etc. Thus, accessing the beverage forming station through the opening may involve any suitable activity.

The door may be moved to the closed position so that the door is flush with at least an outer portion of the housing adjacent a rear, side and/or front edge of the door when the door is in the closed position. As a result, the door may appear, and feel to the touch, as a unitary, continuous part of the housing such that the presence of the door is not readily apparent. The door may have any suitable configuration, e.g., may be a rigid and flat panel, and may be guided in movement in any suitable way, such as by sliding the door along at least one guide track.

For those systems employing a cartridge 1, once a cartridge is located in the beverage forming station 11, the beverage forming apparatus 100 may use the cartridge 1 to form a beverage. For example, one or more inlet needles may pierce the cartridge 1 (e.g., a lid of the cartridge) so as to inject heated water or other liquid into the cartridge 1. The injected liquid may form the desired beverage or a beverage precursor by mixing with beverage medium in the cartridge 1. The apparatus 100 may also include one or more outlet needles or other elements to puncture or pierce the cartridge 1 at an outlet side (e.g., at the lid of the cartridge) to permit the formed beverage to exit the cartridge 1. Other inlet/outlet piercing arrangements are possible, such as multiple needles, a shower head, a non-hollow needle, a cone, a pyramid, a knife, a blade, etc. Other arrangements for an inlet or outlet are possible however, e.g., the cartridge may have a permeable portion that allows water to flow into and/or beverage to exit cartridge 1. Also, there is no requirement that an inlet and/or an outlet pierce a cartridge to provide liquid to, or receive beverage from, a cartridge. Instead, communication with a cartridge may be performed using any suitable ports or other features.

While aspects of the invention may be used with any suitable cartridge, or no cartridge at all, some cartridges may include features that enhance the operation of a beverage forming apparatus 100. As is known in the art, the cartridge 1 may take any suitable form such as those commonly known as a sachet, pod, capsule, container or other. For example, the cartridge 1 may include an impermeable outer covering within which is housed a beverage medium, such as roasted and ground coffee or other. The cartridge 1 may also include a filter so that a beverage formed by interaction of the liquid with the beverage medium passes through the filter before being dispensed into a container 2. As will be understood by those of skill in the art, cartridges in the form of a pod (e.g., having opposed layers of permeable filter paper encapsulating a beverage medium) may use the outer portion of the cartridge 1 to filter the beverage formed. The cartridge 1 in this example may be used in a beverage machine to form any suitable beverage such as tea, coffee, other infusion-type beverages, beverages formed from a liquid or powdered concentrate, etc. Thus, the cartridge 1 may contain any suitable beverage medium, e.g., ground coffee, tea leaves, dry herbal tea, powdered beverage concentrate, dried fruit extract or powder, powdered or liquid concentrated bouillon or other soup, powdered or liquid medicinal materials (such as powdered vitamins, drugs or other pharmaceuticals, nutriaceuticals, etc.), and/or other beverage-making material (such as powdered milk or other creamers, sweeteners, thickeners, flavorings, and so on). In one illustrative embodiment, the cartridge 1 contains a beverage medium that is configured for use with a machine that forms coffee and/or tea beverages, however, aspects of the invention are not limited in this respect.

As used herein, "beverage" refers to a liquid substance intended for drinking that is formed when a liquid interacts with a beverage medium. Thus, beverage refers to a liquid that is ready for consumption, e.g., is dispensed into a cup and ready for drinking, as well as a liquid that will undergo other processes or treatments, such as filtering or the addition of flavorings, creamer, sweeteners, another beverage, etc., before being consumed.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A beverage forming apparatus, comprising:
   a housing to support components of the beverage forming apparatus, the housing having an opening and a flat door movably mounted to the housing to move between a closed position in which the door closes the opening and an open position in which the door is positioned away from the opening, wherein the door is movable to be retracted within the housing in the open position, wherein the door includes a first pin that engages with a first track that guides movement of the door between the open and closed positions, wherein the door moves in a direction perpendicular to a plane of the opening into which the door moves when the door is closed, wherein a forward end of the first track includes a curved section, the curved section arranged to move a rear end of the door downwardly to clear the housing when the door is moved from the closed position towards the open position, and wherein an outer portion of the door is flush with at least an outer portion of the housing adjacent at least a rear edge of the door when the door is in the closed position;
   a beverage forming station supported by the housing and arranged to combine a precursor liquid with a beverage material to form a beverage that is dispensed via a beverage outlet, the beverage forming station including a cartridge holder arranged to receive and hold a cartridge containing beverage material for use in forming a beverage, the cartridge holder accessible through the opening, the beverage material provided by a user through the opening with the door in the open position;
   a precursor liquid supply system supported by the housing for providing precursor liquid to the beverage forming station; and
   a control circuit arranged to control the liquid supply system to deliver precursor liquid to the beverage forming station;
   wherein the cartridge holder is moveable between an open position in which the cartridge holder is oriented to receive the cartridge through the opening, and a closed position in which the cartridge holder is positioned to at least partially enclose a cartridge for forming a beverage;
   wherein the door is linked to the cartridge holder such that movement of the cartridge holder between its open and closed positions moves the door between its open and closed positions.

2. The apparatus of claim 1, further comprising:
   an actuator arranged to move the door and cartridge holder between their respective open and closed positions.

3. The apparatus of claim 2, wherein the actuator includes a handle that is movable to move the door and cartridge holder between their respective open and closed positions.

4. The apparatus of claim 1, wherein the housing includes second, third, and fourth tracks and the door includes second, third and fourth pins that engage with respective tracks, wherein the first and second tracks are rear tracks and the third and fourth tracks are forward tracks.

5. The beverage forming apparatus of claim 4, wherein a forward end of the second track includes a curved section, the curved section of the second track arranged to move the rear end of the door downwardly to clear the housing when the door is moved from the closed position towards the open position.

6. The beverage forming apparatus of claim 5, wherein the rear end of the door moves downwardly to clear the housing when a second pin attached to the rear end of the door moves in the curved section of the second track and the door is moved from the closed position to the open position.

7. The apparatus of claim 1, wherein the outer portion of the door is flush with outer housing portions at the rear edge and at one or more side edges or a front edge of the door.

8. The apparatus of claim 1, wherein the door is rigid and flat.

9. The beverage forming apparatus of claim 1, wherein the curved section causes the rear end of the door to be lifted up in a last portion of the door's movement into the closed position.

10. The beverage forming apparatus of claim 1, wherein the rear end of the door moves downwardly to clear the housing when the first pin attached to the rear end of the door moves in the curved section and the door is moved from the closed position to the open position.

11. The beverage forming apparatus of claim 1, wherein the door is linked to the cartridge holder via a link that is pivotally connected to the cartridge holder and the door.

12. The beverage forming apparatus of claim 1, wherein the cartridge holder is pivotable between the open position in which an opening of the cartridge holder is oriented in an upwardly inclined position and facing a front of the apparatus, and the closed position in which the opening of the cartridge holder is in a downwardly inclined position and pressed against a lid.

13. A beverage forming apparatus, comprising:
   a housing to support components of the beverage forming apparatus, the housing having an opening and a rigid and flat door movably mounted to the housing to move between a closed position in which the door closes the opening and an open position in which the door is positioned away from the opening, wherein the door includes at least one pin that engages with at least one track that guides movement of the door between the open and closed positions, wherein the door is movable to be retracted within the housing in the open position, wherein the door moves in a direction perpendicular to a plane of the opening into which the door moves when the door is closed, wherein a forward end of the at least one track includes a curved section, the curved section arranged to move a rear end of the door downwardly to clear the housing when the door is moved from the closed position towards the open position, and wherein an outer portion of the door is flush with at least an outer portion of the housing adjacent at least one edge of the door when the door is in the closed position;

a beverage forming station supported by the housing and arranged to combine a precursor liquid with a beverage material to form a beverage that is dispensed via a beverage outlet, a portion of the beverage forming station arranged to receive beverage material provided by a user through the opening with the door in the open position;

a precursor liquid supply system supported by the housing for providing precursor liquid to the beverage forming station; and a control circuit arranged to control the liquid supply system to deliver precursor liquid to the beverage forming station;

wherein the beverage forming station includes a cartridge holder arranged to receive and hold a cartridge containing beverage material for use in forming a beverage, wherein the cartridge holder is accessible through the opening;

wherein the cartridge holder is moveable between an open position in which the cartridge holder is oriented to receive the cartridge through the opening, and a closed position in which the cartridge holder is positioned to at least partially enclose a cartridge for forming a beverage;

wherein the door is linked to the cartridge holder such that movement of the cartridge holder between its open and closed positions moves the door between its open and closed positions.

14. The beverage forming apparatus of claim 13, wherein the door is flush with at least an outer portion of the housing adjacent at least a rear edge of the door when the door is in the closed position.

15. The beverage forming apparatus of claim 13, wherein the curved section causes the rear end of the door to be lifted up in a last portion of the door's movement into the closed position.

16. The beverage forming apparatus of claim 13, wherein the rear end of the door moves downwardly to clear the housing when the at least one pin attached to the rear end of the door moves in the curved section and the door is moved from the closed position to the open position.

17. The beverage forming apparatus of claim 13, wherein the door is linked to the cartridge holder via a link that is pivotally connected to the cartridge holder and the door.

18. The beverage forming apparatus of claim 13, wherein the cartridge holder is pivotable between the open position in which an opening of the cartridge holder is oriented in an upwardly inclined position and facing a front of the apparatus, and the closed position in which the opening of the cartridge holder is in a downwardly inclined position and pressed against a lid.

* * * * *